8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $(R^6)_m$, $R^7$, O—A—(CON—B)$_n$—O—C(=O), C(=O)—OR$^5$, $R^2$, $R^3$, $R^4$, N—H, OH (1c)

$R^8$—X (12)

$$\cos\beta^* = \frac{K_2 - n\frac{T'}{v''}}{\sqrt{K_1^2 + \left(K_2 - n\frac{T'}{v''}\right)^2 + K_3^2}}$$

$$v'_{ref}(t) = K\, r\, \delta\left(t - \frac{2L - 2d_s}{v_w}\right) + K(1 - r^2)e^{-2\alpha s d_s}$$

$$(K_1x+K_2y+K_3z+T)+n(K''_1x+K''_2y+K''_3z+T'')=0$$

8 PT.

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

| r₁ (L₁) | r₆ (L₃) | r₇ (L₄) |
|---|---|---|
| K = 1.0 | K = 1.0 | K = 0.0 |
| $C_2$ = 0.0 | $C_2$ = 0.0 | $C_2$ = 0.0 |
| $C_4$ = −0.15691 × 10−6 | $C_4$ = +0.95381 × 10−7 | $C_4$ = −0.22891 × 10−5 |
| $C_6$ = −0.40068 × 10−10 | $C_6$ = −0.73871 × 10−10 | $C_6$ = +0.12283 × 10−9 |
| $C_8$ = +0.21016 × 10−13 | $C_8$ = +0.12280 × 10−13 | $C_8$ = +0.84230 × 10−13 |
| $C_{10}$ = −0.37685 × 10−17 | $C_{10}$ = −0.33177 × 10−17 | $C_{10}$ = −0.20592 × 10−16 |

$f_1$ = 314.6
$f_2$ = 88.0
$f_3$ = −481.2
$f_4$ = −99.6

100mm

= 101.2 Aperture ratio: 1:1.10
agnification of projection: −7.997x
alf angle of view: 28.56°

| | | | |
|---|---|---|---|
| 43.454 | $d_1$ = 11.0 | $n_1$ = 1.49380 | $L_1$ |
| -1542.254 | $d_2$ = 68 | | |
| 16.976 | $d_3$ = 20.0 | $n_2$ = 1.62286 | $L_2$ |
| 10.914 | $d_4$ = 2.87 | | |
| -89.375 | $d_5$ = 5.0 | $n_3$ = 1.59501 | $L_3$ |
| -127.071 | $d_6$ = 58.8 | | |
| -48.609 | $d_7$ = 5 | $n_4$ = 1.49380 | $L_4$ |
| ∞ | | | |
| ∞ | $d_8$ = 5 | $n_5$ = 1.45000 | S |
| ∞ | $d_9$ = 8 | $n_6$ = 1.51872 | G |

FIG. I

U.S. DEPARTMENT OF COMMERCE ★ PATENT AND TRADEMARK OFFICE

IMAGE SYSTEM
TEST TARGET
A
U.S. DEPARTMENT OF COMMERCE
PATENT AND TRADEMARK OFFICE

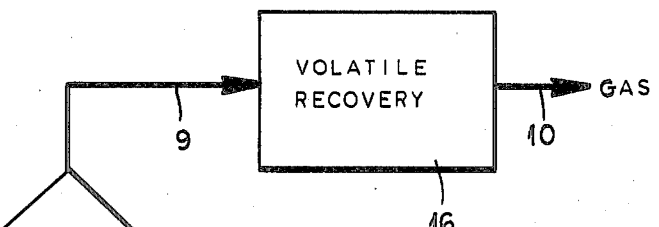
VOLATILE RECOVERY
GAS
9
10
46

METHOD OF PRODUCING AN INTERMEDIATE IN THE PRODUCTION OF SILICON OR SILICON CARBIDE

CROSS REFERENCE TO RELATED APPLICATIONS

This application is related to my copending applications Ser. Nos. 242,991 (now abandoned) and 252,063 filed Mar. 12, 1981 and Apr. 8, 1981, respectively.

FIELD OF THE INVENTION

My present invention relates to the production of elemental silicon or silicon carbide and, more particularly, to a method of producing an intermediate or other composition capable of reaction to form silicon or silicon carbide.

BACKGROUND OF THE INVENTION

As will be apparent from the aforementioned copending applications, the prior art discussed therein and the literature generally dealing with the reaction of silicon dioxide to form elemental silicon or silicon carbide, it is known to react at high temperatures silicon dioxide with carbon substantially stoichiometrically to form elemental silicon or silicon carbide.

In general, any process of this type requires the formation of an intimate combination of silicon dioxide and the carbonaceous material. This composition is then heated by one of a variety of techniques to transform the silicon dioxide into elemental silicon ($SiO_2+2C\rightarrow Si+2CO$) or silicon carbide ($SiO_2+3C\rightarrow SiC+2CO$).

When reference is made herein to "silicon dioxide" as a precursor in the process for the production of elemental silicon, it is intended to include any source of naturally occurring or synthetic silicon dioxide although the preferred material is quartz sand or comminuted quartz. Thus, when reference is made hereinafter to quartz sand, it should be understood that this description also includes other sources of silicon dioxide in comminuted form.

The reaction can be used to produce elemental silicon of high purity and the silicon thus produced can be used for a variety of purposes. For example, it can be employed in the production of ferrosilicon and calcium silicide, compositions having application in metallurgy for the treatment of steel and for alloying purposes. Pure silicon can be used in the semiconductor industry and can be processed, for example, by zone melting processes, to produce bars from silicon wafers.

Silicon carbide SiC, which can be produced by the reactions described above, is extremely hard and, indeed, has a hardness exceeded only by boron carbide and diamond. This material is widely used as an abrasive or a hard-facing material, in the form of powder or pastes and in bonded or like form for grinding wheels, sandpaper and the like.

Silicon carbide abrasives have been found to be ideal for the shaping, finishing or machining of sintered hard metals, cast steels, ductile materials such as aluminum, brass and copper and for nonmetallic substances like rubber, leather and wood.

Silicon carbide is also refractory, i.e. is capable of withstanding high temperatures and hence is suitable for the formation of refractories for special-purpose industrial furnaces wherein the material is utilized because it can rapidly dissipate reaction heat, it readily transmits heat and it has stability and resistance to wear and corrosion.

In the production of zinc, for example, silicon carbide muffles and bricked condensers are utilized for processing zinc ore and for volatilization of zinc and its condensation.

Silicon carbide is also surprisingly resistant to attacks by oxygen at high temperatures and can be used effectively, e.g. with appropriate binders to make heating elements and electrical furnaces. Such heating elements can be capable of withstanding temperatures up to 1500° C.

Silicon carbide has been utilized in infrared heating elements, to make voltage-dependent electrical resistance elements, especially for high power applications and, with appropriate doping, in the production of semiconductors such as high temperature transistors and diodes.

Silicon carbide also can be produced in fiber or foam form and the fibers can be utilized in combination with other fibers to produce refractory fabrics while the foams can serve for insulating purposes.

Notwithstanding the increased importance of silicon and silicon carbide in recent years there has been little change in commercially applied technology in this field in the past century. Then, as now, silicon dioxide was combined with the carbon substance, usually coke powder, and heated. This method has been found to be expensive so that the products made therefrom are also expensive. Furthermore, because of the manner in which production was undertaken, large quantities of silicon and silicon carbide were not always available, nor was it always possible to ensure the high degree of intimacy in the reaction system consisting of the silicon dioxide and the carbon.

OBJECTS OF THE INVENTION

It is the principal object of the present invention to improve upon the earlier approaches to the production of silicon carbide whereby disadvantages of the earlier systems are obviated.

Another object of this invention is to provide an improved method of making an intermediate capable of undergoing reaction to form silicon or silicon carbide whereby problems of intimacy in forming the reaction composition are eliminated and the overall cost of the process is reduced.

SUMMARY OF THE INVENTION

These objects and others which will become apparent hereinafter are attained, in accordance with the present invention, by a method which eliminates the need for intimately mixing quartz sand with coke powder and, instead, involves the deposition of a stoichiometric equivalent of carbon required for the reaction upon the quartz sand particles in a fluidized bed.

More particularly, the invention provides that a fluidized bed formed from silicon dioxide particles (quartz sand particles) which is fluidized by steam and other gases (fluidizing gases) and maintained at a temperature of substantially 500° to 700° C.

According to the invention, moreover, liquid hydrocarbons are introduced into the fluidized bed after having been heated to a temperature above 250° C. and the hydrocarbons are reacted by cracking in the fluidized bed to deposit a coke-like layer of carbon on the particles. This layer in the form of so-called oil or petroleum coke, may be applied in one or more layers in a single pass of the particles through the bed or as a result of multiple passes of particles through the bed, the coated particles falling within the bed as a result of the coating, being removed to form the intermediate which can then be heated, e.g. as described in the aforementioned copending applications, to produce silicon or silicon carbide.

According to an important feature of the invention, during the fluidized bed coating of the quartz sand particles, fresh or previously coated particles are continuously blown into the fluidized bed. Naturally, when previously coated particles are introduced into the bed, the thickness of the coating is increased and additional layers of the carbon are applied thereto.

The energy for the cracking process is supplied by the sensible heat of the quartz sand particles which are introduced into the bed at the aforementioned temperature of 500° to 700° C., i.e. after previously being heated, the preheater being heated, in turn, by combustion of carbon, e.g. from particles cycled to the preheater from the fluidized bed, or by waste gases from the fluidized bed.

While fluidized bed processes for coking hydrocarbons are known in other contexts, and fluidized beds of sand have been employed, I am not aware of any system whereby silicon dioxide particles are coated with petroleum coke in stoichiometric quantities for the reactions expressed above or systems whereby the sufficiency of the coating of the sand particles is determined by the extraction of the particles from the lower portion of the bed to which these particles fall because of the increased coating thicknesses.

In the system of the present invention, the amount of the oil coke deposited on the quartz sand particles depends on both the thermodynamic conditions in the bed and on the residence time of the sand particles in the bed.

According to the invention, the coke layer on the particles should be at least stoichiometric, i.e. should be at least equivalent to the amount of carbon stoichiometric quantity (whereby a portion of the carbon may be burned off in the heater.

The process of the present invention is continuous in the sense that the product withdrawn from the fluidized bed is subdivided into a portion to be recycled and a portion to be discharged, the recycled part being introduced into the fluidized bed heater where part of the carbon of the coating of this portion is burned to generate the heat required to bring the recycled particles and any freshly added sand particles to a temperature of at most 800° C., the heated particle mixture being introduced into the bed.

Thus the withdrawal and recycling of coke-coated particles may be utilized for the control of the temperature with the bed.

Gaseous and condensible hydrocarbons can be withdrawn from the top of the fluidized bed and recovered.

Preferably, the liquid petroleum fed to the bed at a temperature of at least 250° C. is a heavy petroleum fraction of the coal tar or pitch type. Of course other petroleum fractions can be used as well as long as they undergo cracking to leave a carbon deposit under the conditions prevalent in the bed.

The product is a mass of particles of silicon dioxide coated with carbon which can be utilized directly in a furnace for the production of silicon carbide by the methods previously mentioned. When the sand and the petroleum fed are relatively pure, high purity silicon and silicon carbide products can be produced by carrying out the reaction with the intermediate of the present invention.

For the production of silicon, the carbon coated quartz sand, consisting essentially of micropellets forming the reaction system, can be introduced into a conventional three-electrode electrical furnace to produce elemental silicon by the reaction outlined above.

The formation of silicon carbide in the electrical furnace is not possible as a practical matter because the solid silicon carbide tends to grow upon the electrodes and cannot be removed readily from the furnace.

Thus, in the case of silicon carbide, the reaction is usually carried on a horizontal hearth onto which the micropellets are heaped with electrical energy being supplied. The reaction can be carried out in a vacuum or under a blanket of carbon to prevent atmospheric oxygen from interfering with the reaction. The product can be a rod or other solid body of silicon carbide.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating an apparatus for carrying out the process of the invention.

SPECIFIC DESCRIPTION AND EXAMPLE

In the drawing I have shown a fluidized bed reactor 1 into which quartz sand particles are blown at 2 at a temperature of 600° to 800° C. to establish the fluidized bed 5 which is maintained by the introduction of steam at 3 and gases which can be introduced at 4. These gases, which can be waste gases recovered at 10, together with the steam are referred to hereinafter as the fluidizing gases.

The fluidized bed is maintained at a temperature of 500° to 700° C.

Liquid hydrocarbons, previously heated at 11 to a temperature above 250° C., are introduced into the fluidized bed at 6. Under these conditions the hydrocarbons crack on the quartz sand particle surfaces to form a layer of oil coke with the particles increasing in weight and those with the thickest layer tending to accumulate toward the bottom of the bed at which the coke-coated particles are removed at 7. When the system is operated under substantially stable conditions, the particles, which are removed have stoichiometric or stiochiometric carbon contents.

The particles are heated to a temperature of at most 800° C. in the heater 8 to which a portion of the particles is fed at 12, the balance forming the product which is discharged at 13.

Fresh quartz sand particles can be introduced into the heater at 14 and the heater is supplied with oxygen at 15 to burn off a portion of the carbon coating of the recycled particles.

Thus most of the energy for cracking is supplied to the bed 5 in the form of sensible heat of the quartz sand particles delivered at 2. The sensible heat is imparted to these particles in the heater 8 by the combustion of some of the coating of carbon coated particles discharged from the fluidized bed. The fluidizing gases introduced at 4 can include nitrogen and other reducing gases or gases to which the reaction system is inert.

Volatile hydrocarbons formed in the cracking process and other gaseous products including the carbon monoxide are discharged from the top of the reactor at 9 and are passed through a recovery unit 16, e.g. a condenser, so that valuable hydrocarbons are not lost.

I claim:

1. A continuous method of producing an intermediate in the production of silicon or silicon carbide, said intermediate being silicon dioxide particles coated with carbon layers, said method of comprising the steps of:
   - (a) fluidizing silicon dioxide particles in a fluidized bed with a fluidizing gas in the presence of cracking hydrocarbons and at a temperature such that coke coatings form on said particles to produce said carbon layers, the coated particles becoming heavier and sinking toward the bottom of said bed;
   - (b) spraying liquid hydrocarbons heated to a temperature above 250° C. into said bed to crack the liquid hydrocarbons therein and form said cracking hydrocarbons;
   - (c) continuously withdrawing coke-coated particles from the bottom of said bed;
   - (d) continuously feeding coke-coated particles withdrawn in step (c) to a preheater together with fresh silicon dioxide particles, and burning at least part of the coke coatings of the particles in said preheater to heat the particles in said preheater to a temperature of substantially 600° to 800° C.;
   - (e) continuously feeding preheated particles from said preheater in step (d) into the fluidized bed of step (a) for coke-coating therein;
   - (f) continuously feeding fresh silicon dioxide particles into the preheater in step (d); and
   - (g) upon attainment of thermal equilibrium between said preheater and said bed, recovering as said intermediate, an excess of the particles withdrawn in step (c) over the coke-coated particles fed to step (d).

2. The method defined in claim 1, further comprising the step of withdrawing gaseous and condensible hydrocarbons from the top of said fluidized bed.

3. The method defined in claim 1 or claim 2 wherein said liquid hydrocarbons are coal tars, pitches and heavy petroleum fractions, said fluidizing gas including steam.

* * * * *